(12) United States Patent
Elsner et al.

(10) Patent No.: US 10,947,048 B2
(45) Date of Patent: Mar. 16, 2021

(54) POSITIVE DRIVE FOR A SPIRAL CONVEYOR AND BELT MODULE FOR A RADIUS OR SPIRAL CONVEYOR

(71) Applicant: Habasit AG, Reinach (CH)

(72) Inventors: Dietmar Elsner, Lörrach (DE); Martin Moritz, Landser (FR); Arnaud Thuet, Volgelsheim (FR)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 15/648,396

(22) Filed: Jul. 12, 2017

(65) Prior Publication Data

US 2019/0016535 A1 Jan. 17, 2019

(51) Int. Cl.
*B65G 17/08* (2006.01)
*B65G 17/38* (2006.01)
*B65G 17/40* (2006.01)
*B65G 21/18* (2006.01)
*B65G 23/06* (2006.01)
*B65G 23/44* (2006.01)

(52) U.S. Cl.
CPC ......... *B65G 17/086* (2013.01); *B65G 17/385* (2013.01); *B65G 17/40* (2013.01); *B65G 21/18* (2013.01); *B65G 23/06* (2013.01); *B65G 23/44* (2013.01); *B65G 2207/24* (2013.01)

(58) Field of Classification Search
CPC ..... B65G 17/086; B65G 17/385; B65G 21/18
USPC ........................................................ 198/778
See application file for complete search history.

(56) References Cited

U.S. PATENT DOCUMENTS

| 3,348,659 | A | | 10/1967 | Roinestad |
| 3,659,697 | A | * | 5/1972 | Brackmann .......... B65G 17/066 198/778 |
| 4,450,953 | A | * | 5/1984 | Le Cann ................ B65G 21/18 198/778 |
| 4,741,430 | A | | 5/1988 | Roinestad |
| 5,372,248 | A | * | 12/1994 | Horton ................. B65G 17/086 198/834 |
| 5,375,695 | A | | 12/1994 | Daringer et al. |
| 6,062,375 | A | | 5/2000 | Pupp |
| 6,227,356 | B1 | | 5/2001 | van Zijderveld et al. |

(Continued)

FOREIGN PATENT DOCUMENTS

| EP | 0095933 A2 | 12/1983 |
| EP | 0219210 A1 | 4/1987 |

(Continued)

*Primary Examiner* — William R Harp
(74) *Attorney, Agent, or Firm* — Hodgson Russ LLP

(57) ABSTRACT

The present disclosure may be embodied as a belt module for a radius or spiral conveyor. The belt module includes first link ends extending in a direction of belt travel. Each first link end has a transverse opening. Second link ends extend in a direction opposite the first link ends and are configured to interdigitate with the first link ends of an adjacent belt module, and each second link end has a transverse opening defined therein. The transverse openings of the first and/or the second link ends are elongated. The belt modules further include a collapsible tab for contacting a frame member. The collapsible tab is located at a first transverse end of the belt module. In some embodiments, the collapsible tab is configured to engage a drive bar. The belt module may further include a guide tooth on a bottom side of the module for engaging a guide.

16 Claims, 9 Drawing Sheets

(56) References Cited

U.S. PATENT DOCUMENTS

| | | | |
|---|---|---|---|
| 7,234,589 B2* | 6/2007 | Sedlacek | B65G 17/086 198/840 |
| 7,258,226 B2 | 8/2007 | Nelson et al. | |
| 7,347,316 B2 | 3/2008 | Heber | |
| 8,181,771 B2* | 5/2012 | Talsma | B65G 21/18 198/778 |
| 8,302,764 B2* | 11/2012 | Johnson | B65G 21/18 198/778 |
| 8,720,676 B2* | 5/2014 | Neely | B65G 17/385 198/850 |
| 9,079,719 B2 | 7/2015 | Talsma et al. | |
| 9,394,109 B2* | 7/2016 | Talsma | B65G 21/18 |
| 9,481,523 B2* | 11/2016 | Talsma | B65G 17/086 |
| 9,815,630 B1* | 11/2017 | Coto | B65G 21/18 |
| 9,873,564 B2* | 1/2018 | Mueller | B65G 17/02 |
| 9,884,723 B2* | 2/2018 | Neely | B65G 21/18 |
| 2008/0017483 A1 | 1/2008 | Lago | |
| 2011/0017576 A1 | 1/2011 | Andersen | |
| 2013/0319829 A1 | 12/2013 | Stefanko et al. | |

FOREIGN PATENT DOCUMENTS

| | | |
|---|---|---|
| EP | 2546175 A1 | 1/2013 |
| WO | 2012/074383 A1 | 6/2012 |
| WO | 2013/128246 A1 | 9/2013 |

\* cited by examiner

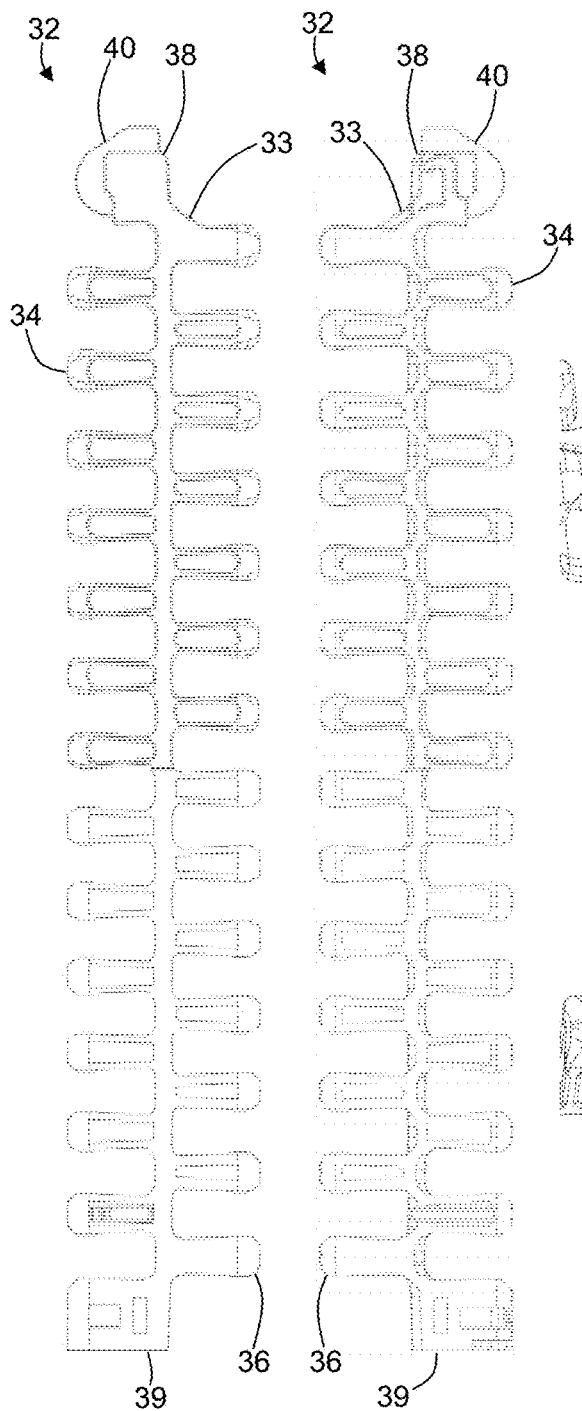
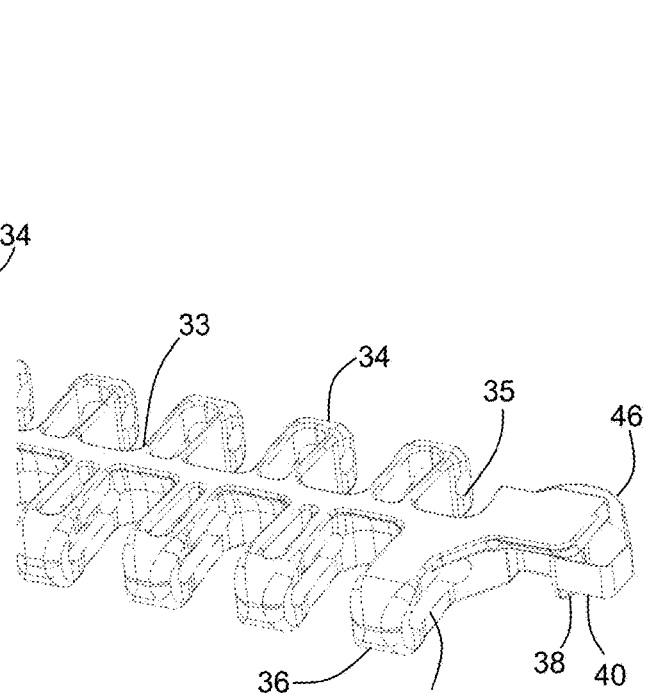
Fig. 4C
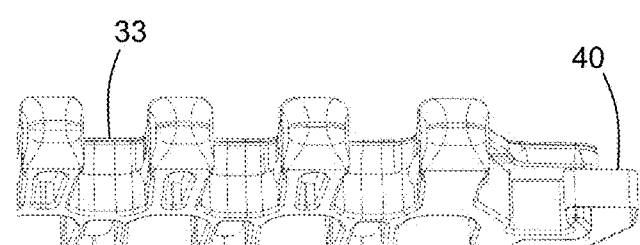
Fig. 4D
Fig. 4A    Fig. 4B

POSITIVE DRIVE FOR A SPIRAL CONVEYOR AND BELT MODULE FOR A RADIUS OR SPIRAL CONVEYOR

FIELD OF THE DISCLOSURE

The present disclosure relates to spiral conveyors, and more particularly to drive systems used for spiral conveyors.

BACKGROUND OF THE DISCLOSURE

Conveyor belts traveling a helical path (so-called "spiral conveyors") are often used to convey articles through climate-controlled environments over an extended period of time. For example, spiral conveyors are used to convey food items through freezers, proofers, etc.

Some previous spiral conveyors have been driven at locations of the belt path outside the spiral, requiring a very high belt tension near the drive location(s) in order to pull the belt through the spiral. To reduce the belt tension, other spiral conveyors have been driven using an overdrive configuration where a conveyor belt follows a helical path around a central drum, and the central drum drives the belt by friction with the inside edge of the belt. The central drum is driven at a speed which is greater than the speed of the belt (i.e., the belt is allowed to slip). In this way, the belt is driven along the entire helical path around the central drum thereby eliminating the need for a high maximum belt tension at a drive location. However, overdrive systems for spiral conveyors may create considerable wear on the driven edge of the conveyor belt and the outer surfaces of the drum due to the constant slipping of the belt on the drum. Furthermore, in addition to the frictional drum drive, a second drive must be used to define the belt speed.

Additionally, it is difficult to predict the coefficient of friction between the drum and the belt because the coefficient depends on factors such as temperature, humidity, surface roughness, surface shape, contact pressure, speed, etc. Another impact to the coefficient of friction results from the articles being conveyed. For example, when conveying foodstuffs like marinated meat, fat and other drippings may come into contact with the drum, in which case the coefficient of friction between the drum and the belt will decrease significantly. In a more particular example, the coefficient of friction between a steel drum and a belt made from polypropylene is approximately 0.3, whereas if a substance like fat from conveyed meat is introduced between the drum and the belt, the coefficient may drop to 0.1 or less. The driving force imparted on the belt by the drum will drop commensurate to the change in coefficient of friction. Ultimately, such a change in driving force will likely interrupt production due to belt lift up, belt breakage, or both.

Other spiral conveyor systems use positive drives, wherein the rotating drum includes drive bars around its periphery to directly engage structures on the inside edge of the driven conveyor belt. Such positive drive system do not rely on slippage and friction between the drum and the belt, and therefore, do not suffer from the disadvantages of overdrive system. However, positive drive systems are problematic where the conveyor belt comes into contact with the drum (the "infeed"). At the infeed, as the inside edge of the belt collapses into the turn radius of the drum, there is a momentary difference between the pitch of the drive bars on the drum and the pitch of the structures on the insider edge of the belt. This difference in pitch can cause chatter, surges in belt tension, and other issues with the conveyor belt which can result in belt breakage.

Accordingly, there is a long-felt need for a positive drive spiral conveyor having an infeed to cleanly engage a belt.

BRIEF SUMMARY OF THE DISCLOSURE

The present disclosure may be embodied as a belt module for a radius or spiral conveyor. The belt module comprises a plurality of first link ends extending in a direction of belt travel. Each first link end has a transverse opening defined therein. A plurality of second link ends extend in a direction opposite the first link ends. The second link ends are configured to interdigitate with the first link ends of an adjacent belt module, and each second link end has a transverse opening defined therein. The transverse openings of the first link ends and/or the second link ends are elongated. The belt module further includes a collapsible tab for engaging a frame member. The collapsible tab is located at a first transverse end of the belt module. In some embodiments, the collapsible tab includes a drive face for engaging a drive surface of a drive bar, for example, when the frame member is a drive bar (or a plurality of drive bars configured as a drum). The belt module may further include a guide tooth on a bottom side of the module for engaging a guide.

Each collapsible tab may be spring biased to an extended position. In some embodiments, each collapsible tab is a spring. The spring has a spring rate selected such that the collapsible tab will not fully collapse until a belt tension is greater than a pre-determined threshold. The spring may be configured to act between the belt module and an adjacent belt module to impart a force separating the belt module form the adjacent belt module. The collapsible tab may be detachable from the belt module. The belt module may further include a second collapsible tab for contacting a frame member. The second collapsible tab may be located at a second transverse end of the belt module opposite the first transverse end. The second collapsible tab may be configured to engage a drive bar.

In another aspect, the disclosure may be embodied as a spiral conveyor. The spiral conveyor comprises a rotating drum having a cylindrical periphery extending from a bottom end of the drum to a top end of the drum. The drum has a plurality of parallel drive bars arranged on the periphery of the drum. The spiral conveyor further includes a conveyor belt configured to advance along a helical path around the periphery of the drum from an infeed to an outfeed. The conveyor belt includes a plurality of rows of belt modules. Each row of belt modules is hingedly connected together with its adjacent rows from a first transverse end of the rows to an opposite second transverse end of the rows, the first transverse end of at least some of the plurality of rows including a collapsible tab configured to engage with a drive bar of the drum for advancing the conveyor belt. The collapsible tabs may be spring-biased to an extended position. In some embodiments, the collapsible tab is a spring. The springs may have a spring rate configured to regulate the radius of the conveyor belt to maintain a substantially constant belt tension. The collapsible tabs may be configured to disengage from the drive bars if a belt tension exceeds a maximum tension.

In some embodiments of spiral conveyor, each drive bar has a width selected to act on a predetermined number of unengaged collapsible tabs of rows. A radius of the conveyor belt along the helical path may decrease as the unengaged collapsible tabs are urged against the drive bars by increasing belt tension. The drum may further include a guide at the infeed, where the guide is configured to ease the conveyor belt into engagement with the drive bars of the drum. The guide may be configured to ease the conveyor belt into engagement with the drive bars over a distance of, for example, between 0.1 and 3 meters, inclusive, but could be greater or less. The guide may be, for example, a rail. Each row of belt modules may include a tooth configured to act on the rail. In some embodiments, the guide is a tapered skirt interdigitated with the drive bars.

In another aspect, the present disclosure may be embodied as a method for load compensation in a radius belt. The method includes providing a belt having a plurality of belt modules each with a collapsible tab at a first transverse end of the respective belt module. For example, the belt may be configured as any belt with collapsible tabs described herein. During belt travel around a radius turn, the collapsible tabs of a subset of the plurality of belt modules are contacted with a frame member at an insider (inner side) of the radius turn. The collapsible tabs are caused to collapse against the frame member according to a tension of the belt. A higher belt tension will cause an increased collapse of the collapsible tabs thereby reducing a radius of the belt at the radius turn. A lower belt tension will cause a decreased collapse of the collapsible tabs thereby increasing a radius of the belt at the radius turn. The frame member may further comprise a plurality of drive bars. In some embodiments, the frame member is stationary.

DESCRIPTION OF THE DRAWINGS

For a fuller understanding of the nature and objects of the disclosure, reference should be made to the following detailed description taken in conjunction with the accompanying drawings, in which:

FIG. 4A is a top view of a belt module row according to an embodiment of the present disclosure;

FIG. 4B is a bottom view of the belt module row of FIG. 4A;

FIG. 4C is a top perspective view of a detail of the belt module of FIGS. 4A-4B;

FIG. 4D is a bottom perspective view of a detail of the belt module of FIGS. 4A-4C;

DETAILED DESCRIPTION OF THE DISCLOSURE

Figure 1:
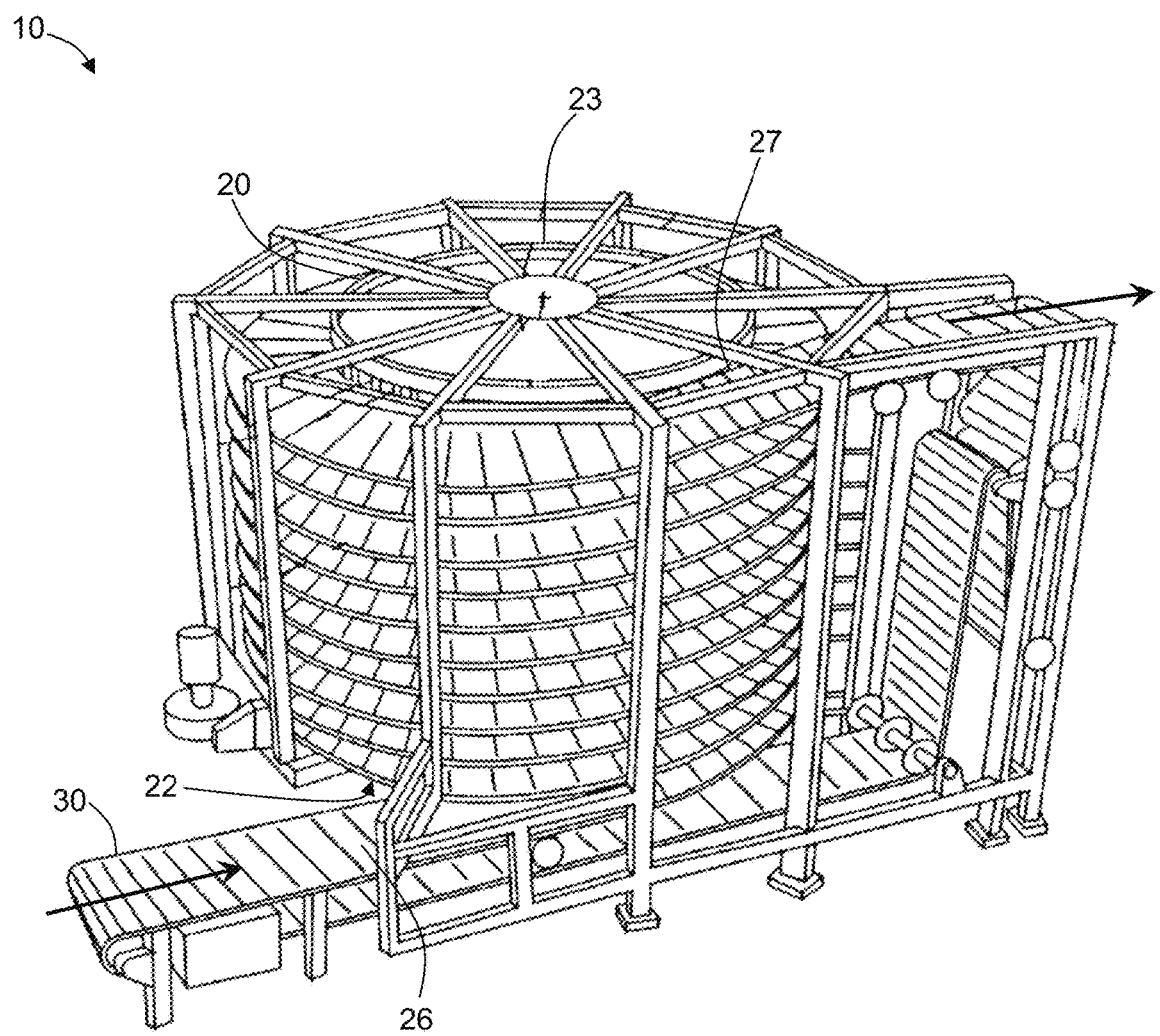
FIG. 1 is a perspective view of a spiral conveyor according to an embodiment of the present disclosure.

With reference to FIG. 1, the present disclosure may be embodied as a spiral conveyor 10. The spiral conveyor 10 has a rotating drum 20 with a cylindrical periphery extending from a bottom end 22 of the drum 20 to a top end 23 of the drum 20. A plurality of drive bars 24 are arranged on the periphery of the drum 20 (see, e.g., FIG. 2). The drive bars 24 are arranged parallel with one another. In some embodiments, the drive bars 24 are arranged such that a primary longitudinal axis of each drive bar 24 is perpendicular to a direction of drum rotation (i.e., parallel to the rotational axis of the drum 20).

Figure 3:
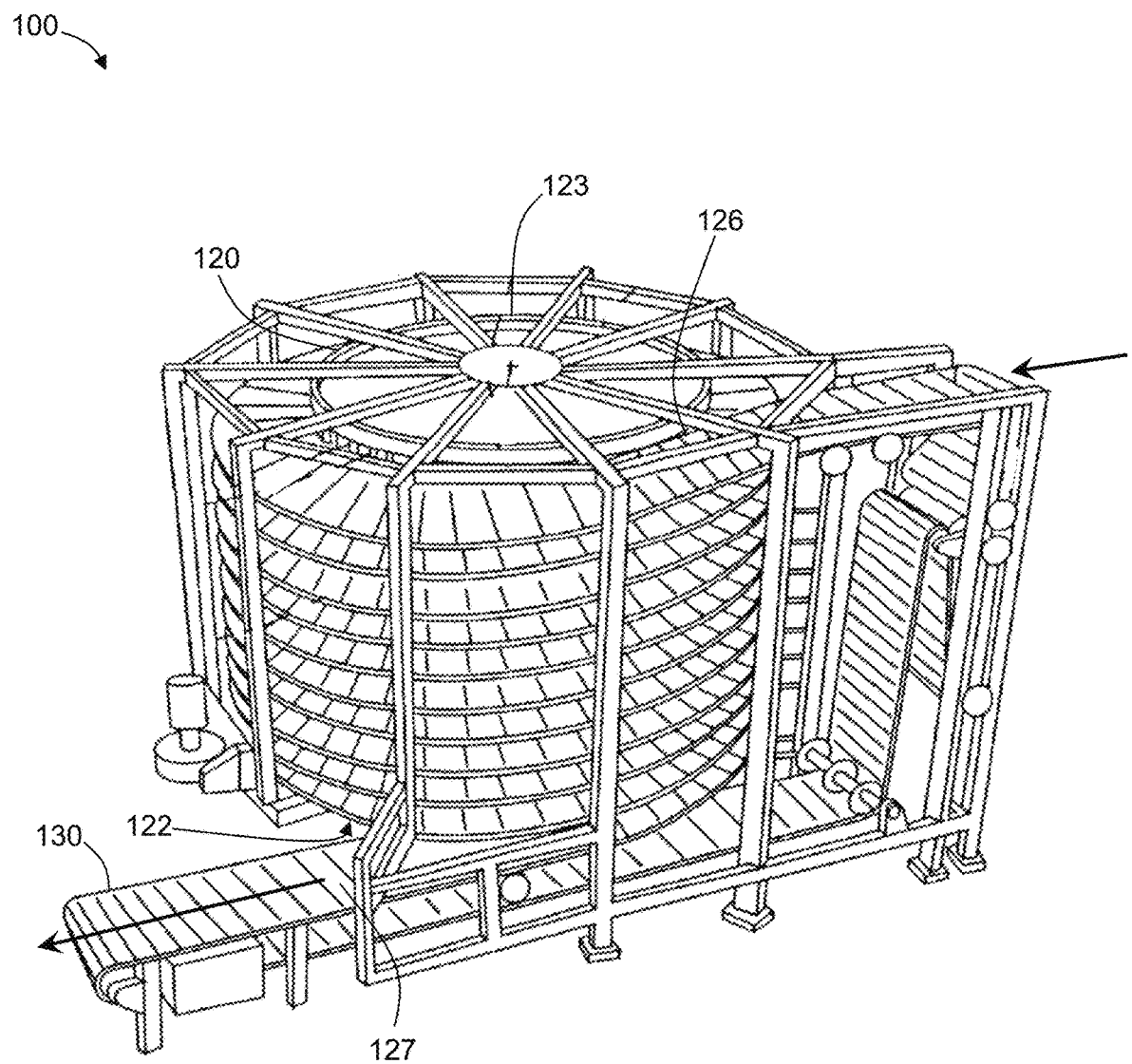
FIG. 3 is a perspective view of a spiral conveyor according to another embodiment of the present disclosure.

The spiral conveyor 10 has a conveyor belt 30 which is configured to advance along a helical path around the periphery of the drum 20 from an infeed 26 (where the belt 30 first engages the drum 20) to an outfeed 27 (where the belt 30 disengages the drum 20). In some embodiments, the infeed 26 may be near the bottom end 22 of the drum 20 and the outfeed 27 is near the top end 23 of the drum 20. In such an embodiments, the belt 30 ascends the drum 20 along a helical path. In other embodiments such as that depicted in FIG. 3, the infeed 126 is near the top end 123 and the outfeed 127 is near the bottom end 122 such that the belt 130 descends the drum 120 along a helical path.

Figure 2:
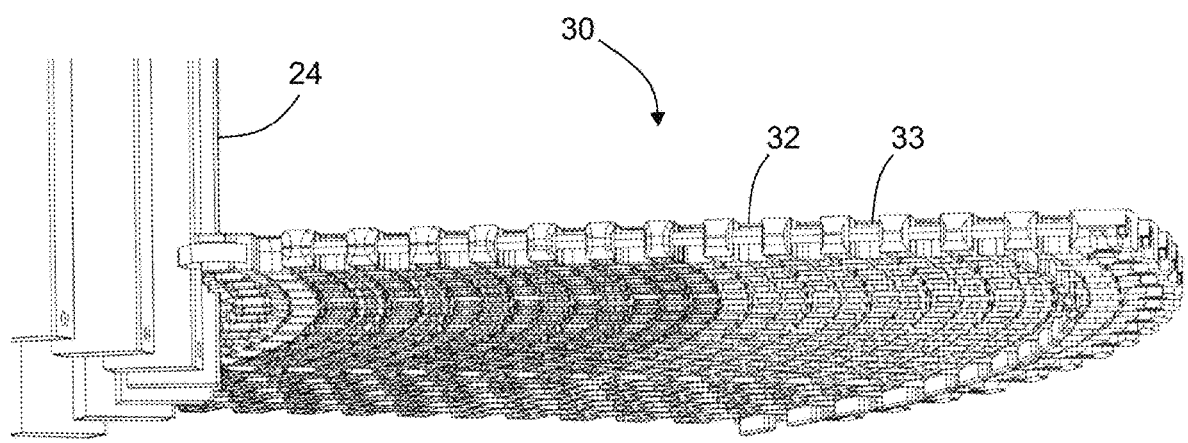
FIG. 2 is a perspective view of a detail of a spiral conveyor according to the present disclosure.

The conveyor belt 30 is made up of a plurality of rows 32 of belt modules 33 (see FIG. 2). Each row 32 is made up of one or more belt modules 33 hingedly connected with belt modules of the respective adjacent rows. In some embodiments, each row is linked with the adjacent rows using a pivot rod. Other embodiments may use a rodless connection between adjacent rows. In an exemplary embodiment using a pivot rod, a belt module 33 may have a plurality of first link ends 34 extending in a direction of belt travel (see, e.g., FIGS. 4A-4D). Each of the first link ends 34 includes a transverse opening 35. The belt module 33 further includes a plurality of second link ends 36 extending in a direction opposite the direction of the first link ends 34, each second link end 36 having a transverse opening 37. The second link ends 36 are configured to interdigitate with the first link ends 34 of an adjacent belt module 33 such that the transverse openings 35, 37 are aligned and a pivot rod may be disposed therethrough. In a belt configured to be driven around a radius (such as a spiral conveyor belt), the transverse openings of the first link ends and/or the second link ends are elongated such that the belt modules can collapse at the inside of a radius turn. In embodiments having rodless hinged connections, the rows are similarly configured for use with radius turns.

Each belt module 33 has a first transverse end 38 and a second transverse end 39 which form the side edges of a conveyor belt 30 when a plurality of belt modules are formed into a belt. The first transverse end 38 has a collapsible tab 40 for contacting a frame member of the conveyor. In this way, at least some of the rows 32 of the plurality of rows include a collapsible tab 40 at the first transverse end 38. The collapsible tab 40 may be spring biased to an extended position (i.e., extended in the transverse direction). For example, one or more springs may act between the belt module and the collapsible tab such that the tab is normally extended and the tab collapses when a force is applied against the spring force of the one or more springs. In the context of the collapsible tabs, extension or collapse is generally intended to be in the transverse direction (unless otherwise noted). As such, a collapsible tab collapses such that the corresponding belt module row will move towards the frame member—e.g., inwards with respect to the radius turn. In some embodiments, such as the embodiment depicted in FIG. 5, the frame member is a drive bar 24 and a collapsible tab 54 is configured to contact the drive bar 24. In such embodiments, the collapsible tab 54 may comprise a drive face 55 for engaging with a drive surface 25 of the drive bar 24.

Figure 13A:
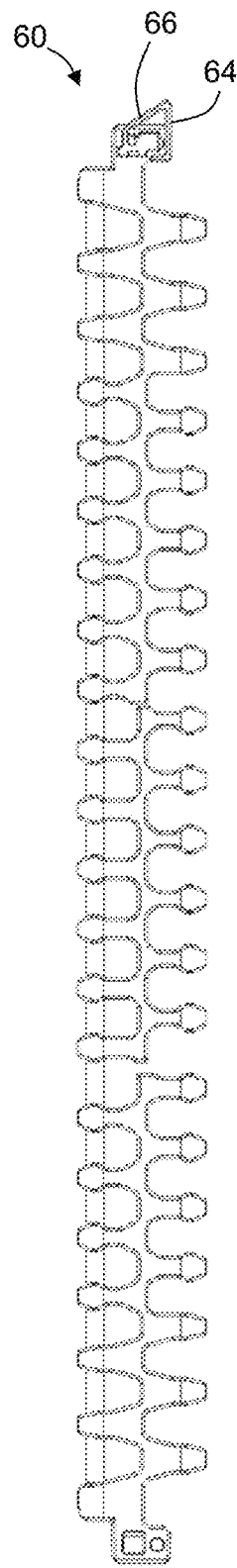
FIG. 13A is a top view of a belt module row according to another embodiment of the present disclosure.
Figure 13B:
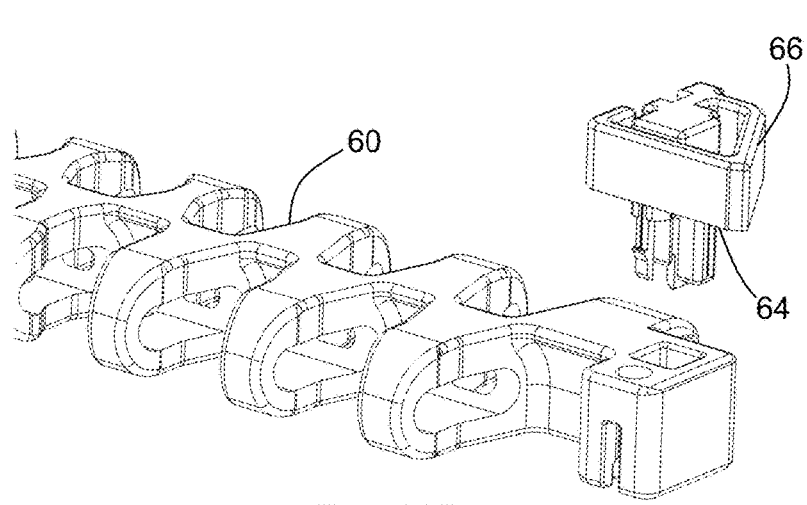
FIG. 13B is a top perspective exploded view of a portion of the belt module row of FIG. 13A, showing a collapsible tab spaced apart from the module.
Figure 13C:
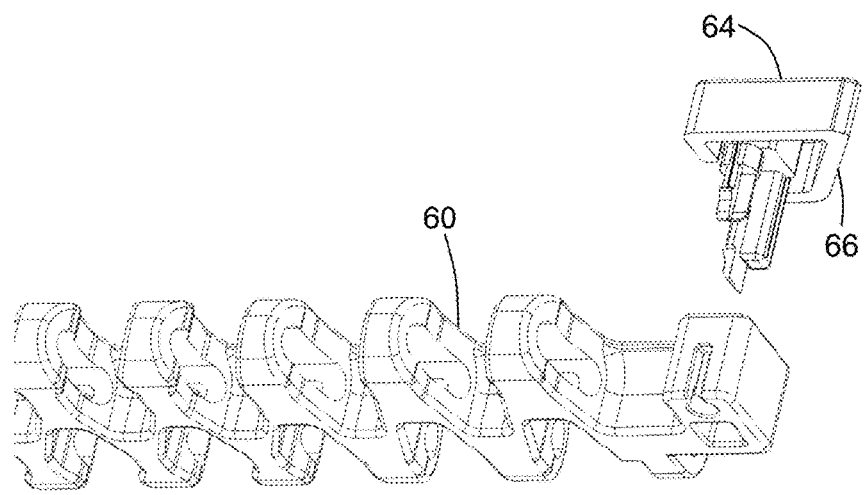
FIG. 13C is a bottom perspective exploded view of the tab and module of FIG. 13B.

In some embodiments, the collapsible tab is a spring, such as, for example, a flat spring. For example, in the embodiment depicted in FIGS. 4A-4D, a collapsible tab 40 is made from spring steel and connected to the belt module 32 by way of a curved portion 46 configured to provide a spring force in a transverse direction. In another example depicted in FIGS. 13A-13C, a collapsible tab 64 is shaped with a tapered portion 66. In some embodiments, the collapsible tab 64 is detachable from the belt module 60. In this way, existing belts may be retrofitted with collapsible tabs at one or both transverse ends by attaching suitable collapsible tabs. Tabs can be made from any suitable material including, for example, metal, plastic, composites, or combinations thereof.

Figure 6A:
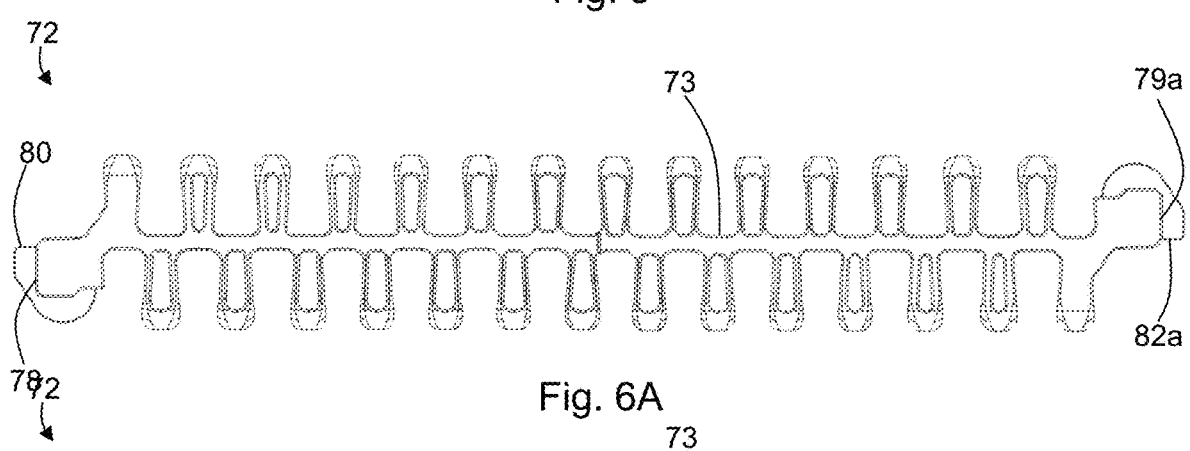
FIG. 6A is a top view of a belt module row according to another embodiment of the present disclosure, wherein the belt module row includes a second collapsible tab at a second transverse end and configured for engagement in the opposite direction of belt travel as the collapsible tab.
Figure 6B:
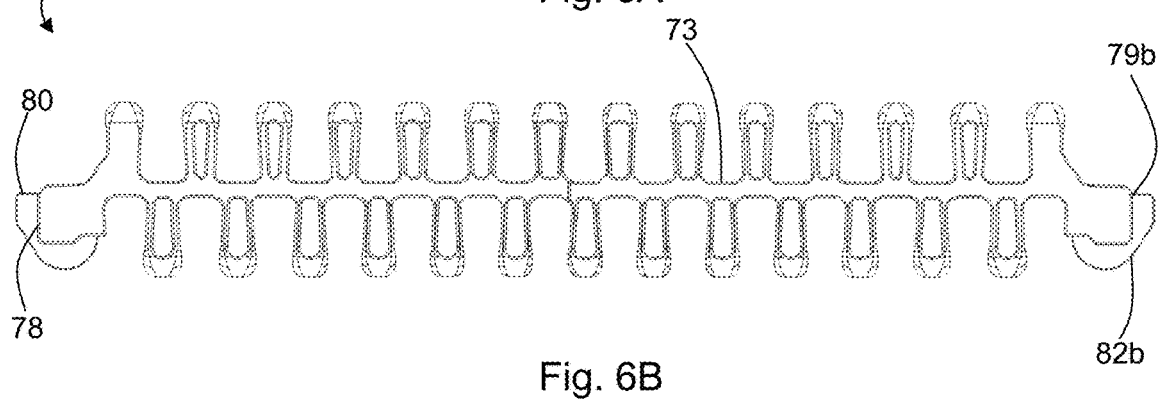
FIG. 6B is a top view of a belt module row according to another embodiment of the present disclosure, wherein the belt module row includes a second collapsible tab at a second transverse end and configured for engagement in the same direction of belt travel as the collapsible tab.
Figure 8:
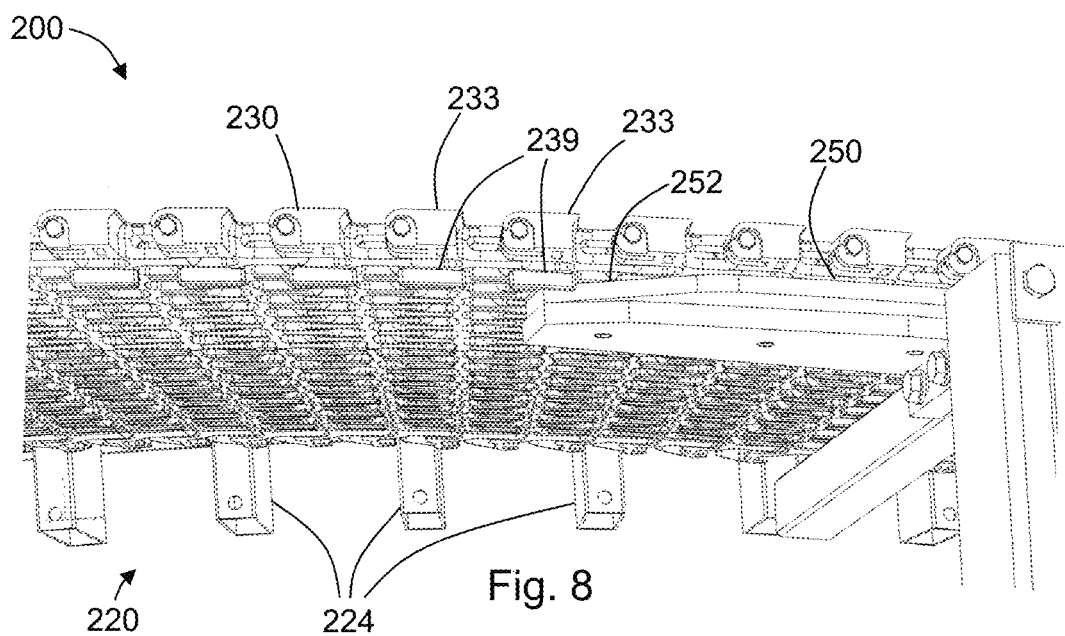
FIG. 8 is a bottom perspective view of a portion of an infeed of a spiral conveyor according to an embodiment of the present disclosure.

In some embodiments, such as that depicted in FIG. 6A, a row 72 of belt modules 73 may have a collapsible tab 80 at a first transverse end 78 and a second collapsible tab 82a located at a second transverse end 79a. The second collapsible tab 82a is may be configured to contact a frame member and/or engage a drive bar in much the same way as the first collapsible tab 80. Such a belt configuration would allow for use in opposite belt directions (FIG. 6A). FIG. 6B shows an embodiment having a second collapsible tab 82b at a second transverse end 79b, and where the collapsible tab 82b is configured to engage drive bars in the same direction of belt travel as the collapsible tab 80. In this way, a belt may traverse curves and spirals having an opposite curvature from the FIG. 8 depicts a portion of a spiral conveyor 200 having a guide 250 at the infeed. The guide 250 is configured to ease the conveyor belt 230 into engagement with the drive bars 224 of the drum 220. In other words, the guide 250 allows for control of the movement of the belt 230 towards the spiral (e.g., the radius of the turn made by the belt 230 as it enters the spiral). The guide 250 may be configured to ease the conveyor belt 230 into engagement with the drive bars 224 over a distance measured from the location where the belt 230 enters the infeed (initially engaging the drum 220) to the location where the belt 230 is fully engaged with the drum 220. The distance may vary according to the particular application. In some embodiments, the guide 250 eases the belt 230 into engagement with the drive bars over a distance ranging from ⅛ to ½ of the circumference of the drum, inclusive. In some embodiments, the distance is more than ½ of the drum circumference. In other embodiments, the distance is less than ⅛ of the drum circumference. In some embodiments, the distance can be in the range from 0.1 meters to 3 meters, inclusive, although the distance can be more or less than this exemplary range.

It should be noted that the amount of engagement between the drive face of the collapsible tab of the belt modules and the drive surface of the drive bars will vary according to the spring force provided by the collapsible tab. As a belt travels a straight path, there is no force that will work against the spring force and cause the tab to collapse. As the belt enters a curved path and begins to engage the drum, the belt tension will cause a radial force $F_P$ towards the inside of the curve. The spring force of the collapsible tabs will counter this radial force. A lower spring force will allow for increased engagement between the tab and the drive bars—i.e., the transverse end of the belt module will move deeper into the cage formed by the drive bars, thereby decreasing the radius of the curved path of the belt. A larger spring force will have the opposite effect. In light of this variability, the belt may be considered to be fully engaged with the drum at a location of the infeed where the belt is no longer affected by the guide.

In some embodiments, the spring rate of the collapsible tabs may cause a radius of the conveyor belt along the helical path to decrease as at least some of the unengaged tabs (tabs not engaged to drive the belt) are urged against the drive bars by increasing belt tension. In some embodiments, the spring rate is configured to regulate the radius of the conveyor belt to maintain a substantially constant belt tension.

Figure 5:
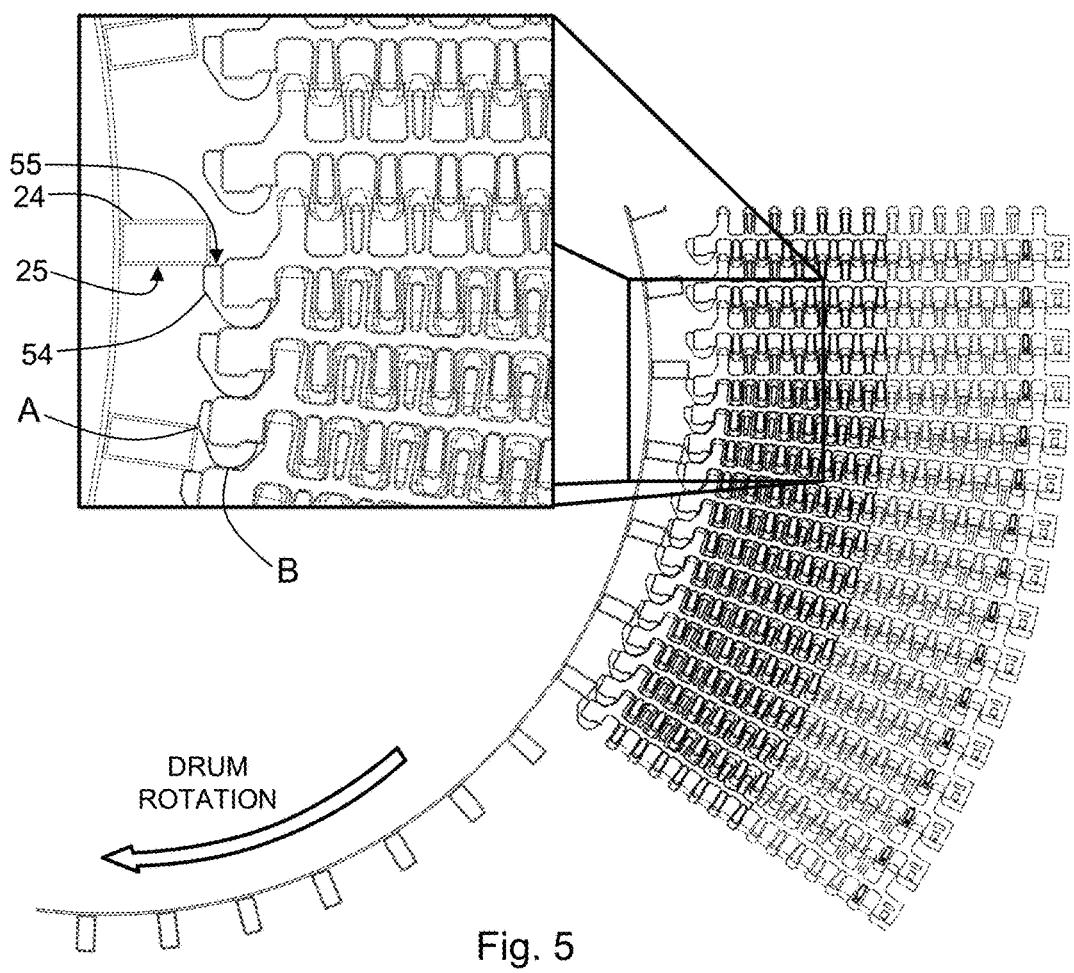
FIG. 5 is a top detail view of an infeed of a spiral conveyor according to an embodiment of the present disclosure, and including an inset of a further detailed portion.

In some embodiments, the drive bars may have a width selected to act on a pre-determined number of collapsible tabs. For example, in FIG. 5, it can be seen that the drive bars have a width configured to act on one collapsible tab (see, for example, the point labeled as 'A'). In this context, "acting on" the collapsible tab(s) is intended to mean that a drive bar and one or more tabs may act on each other to cause compression of the spring force of the tab. In this way, if, for example, a drive bar were configured to act on the collapsible tabs of two belt modules, the spring force working against the drive bar would be doubled. Other configurations of drive bars acting on one or more collapsible tabs will be apparent in light of the specification and are included within the scope of the disclosure. FIG. 5 also shows, at point 'B,' where the spring of a collapsible tab is also configured to act between the belt module of the tab and an adjacent belt module. In this way, the spring may impart a force separating the belt module from the adjacent belt module (i.e., maintaining a separation between the modules). Such a configuration may also reduce belt noise and dampen vibration.

Figure 7A:
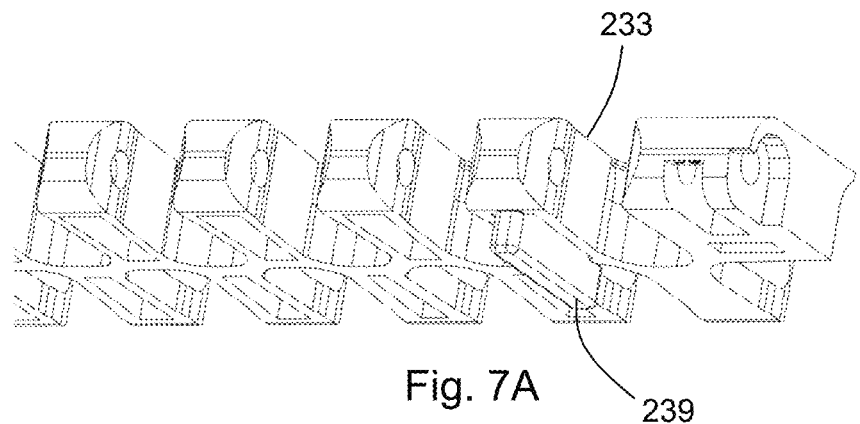
FIG. 7A is a bottom perspective view of a portion of a belt module according to the present disclosure.
Figure 7B:
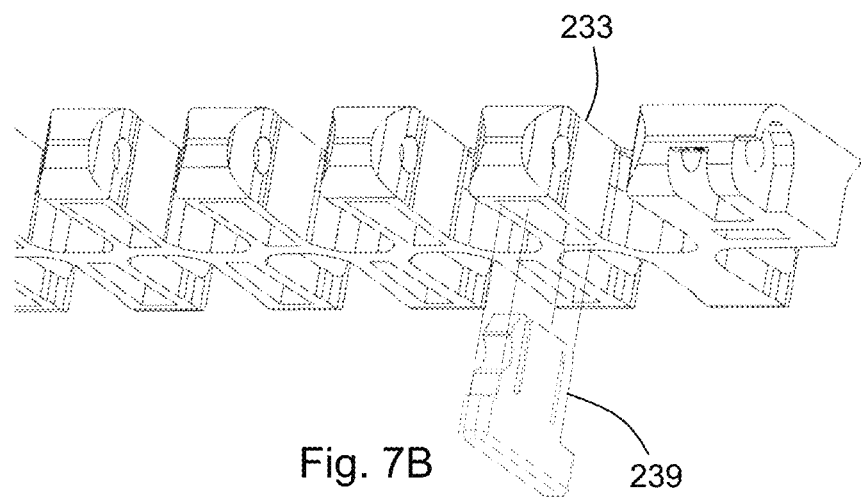
FIG. 7B is an exploded view of the belt module portion of FIG. 7A.

The spiral conveyor of FIG. 8 shows an embodiment where the guide 250 is a rail 252 acting on a tooth 239 of at least some of the belt modules 233. In the example shown in FIG. 8, each tooth 239 extends from a bottom side of the corresponding belt module 233 at a location along the length of the belt module 233, for example, near the inside or the outside of the curved path of the belt 230. Other configurations will be apparent in light of the present disclosure. In some embodiments, such as the embodiment depicted in FIGS. 7A and 7B, the tooth 239 is removably attached to the belt module 233. In this way, teeth can be added to an existing belt where the spiral conveyor is retrofitted.

Figure 9:
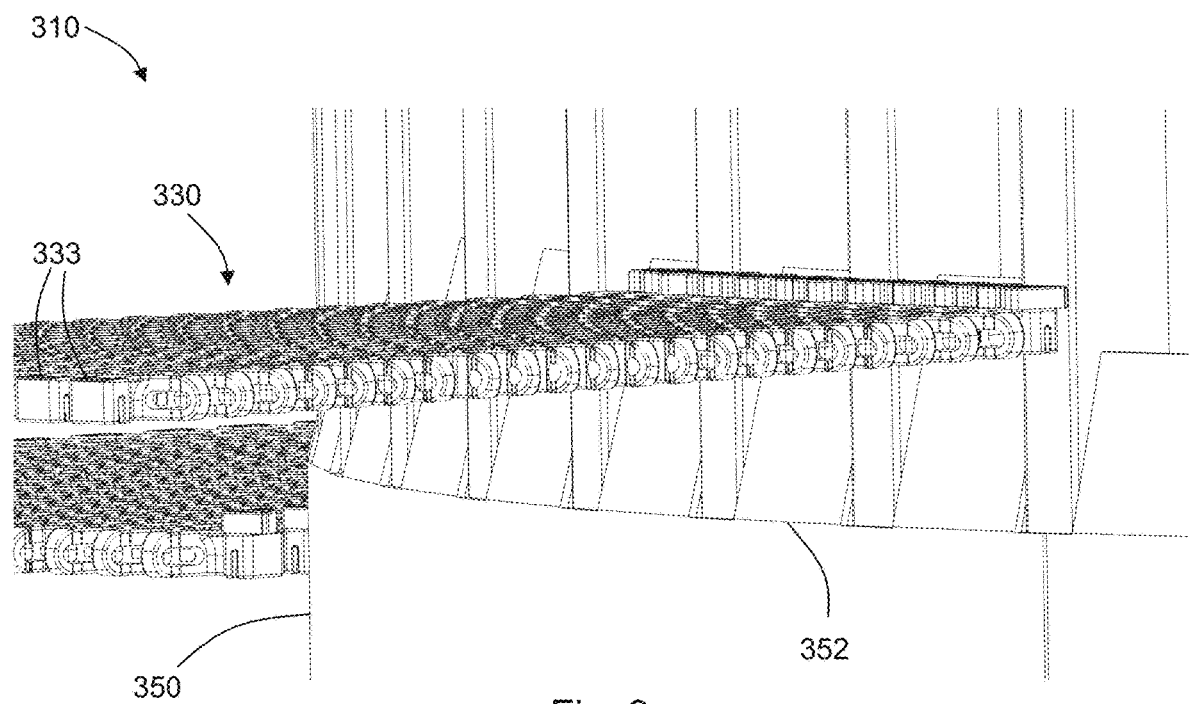
FIG. 9 is a side perspective view of a portion of a spiral conveyor having a guide comprising a tapered skirt, and further showing two conveyor belt portions at different vertical heights along the drum.
Figure 10:
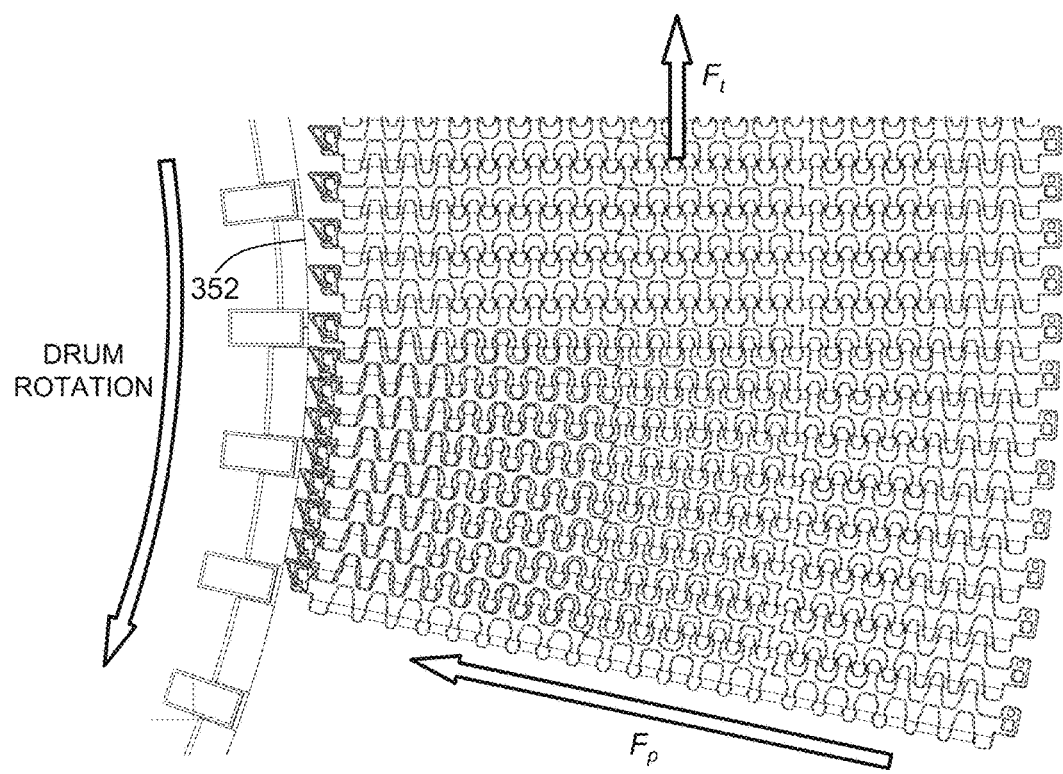
FIG. 10 is a top view of a portion of an infeed of the spiral conveyor belt of FIG. 9.
Figure 11:
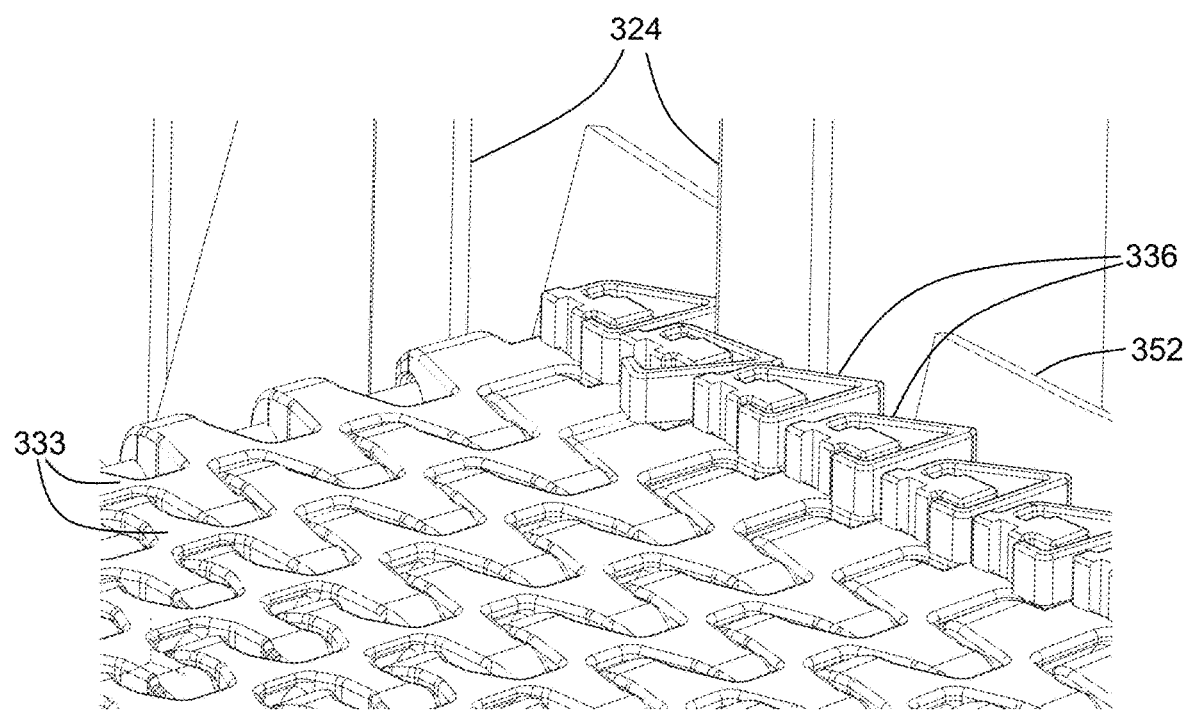
FIG. 11 is a perspective view of a detail of the spiral conveyor of FIGS. 9-10.
Figure 12:
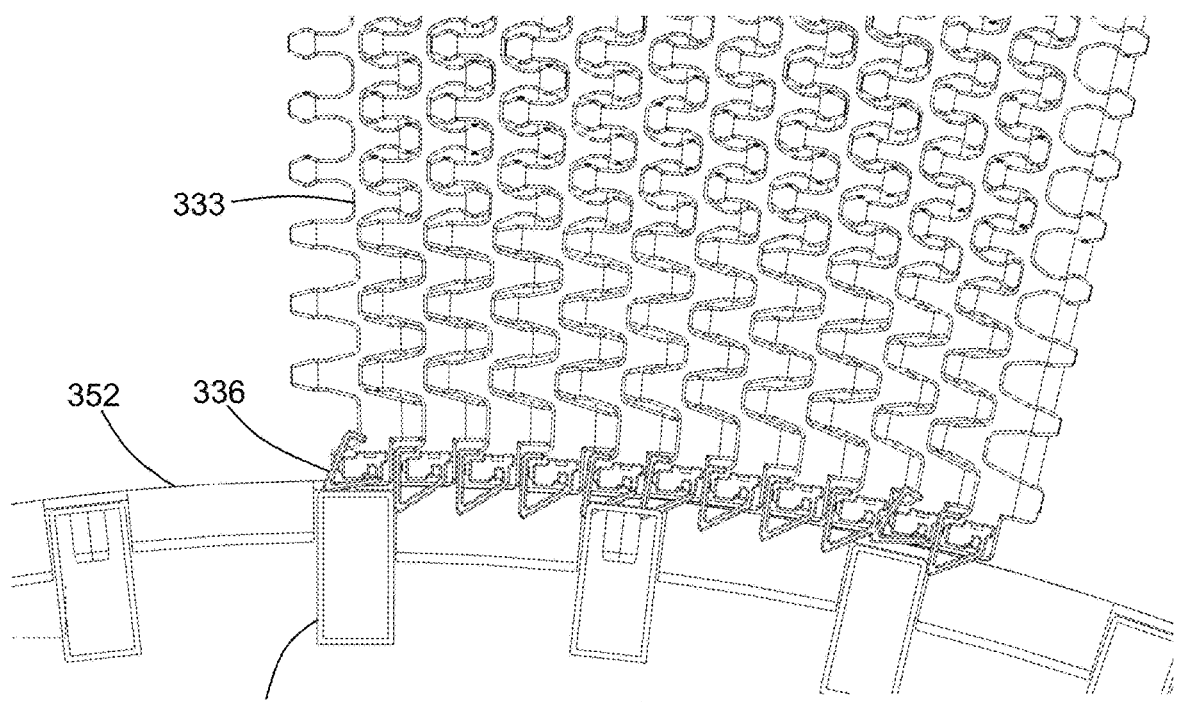
FIG. 12 is a top view of a portion of the conveyor of FIGS. 9-11.

In the exemplary embodiment depicted in FIGS. 9 and 10, a spiral conveyor 310 includes a guide 350 which is a tapered skirt 352 at the infeed. The taper of the skirt 352 is configured to allow movement of the conveyor belt modules 333 towards the inside of the curved path as the belt 330 moves up (or down, as the case may be) the drum along the helical path. FIGS. 11 and 12 show detailed views of collapsible tabs 336 of belt modules 333 as they begin to engage the drive bars 324 (FIG. 11) and then fully engage the drive bars 324 (FIG. 12).

With reference to FIG. 10, the use of spring biasing allows embodiments of the present disclosure to automatically compensate for varying belt load. As a belt is more fully loaded, a higher belt tension would follow (force $F_t$ in FIG. 10). Such higher belt tensions will cause a higher radial force ($F_p$) component as the belt curves, and this higher radial force will cause the collapsible tab to further collapse against its spring force—i.e., collapse further than it would with a more lightly-loaded belt. This further collapse results in a shorter radius of the curve of the belt as the belt modules move closer to the drive bars. However, it is known that belt tension decreases when a curves on a shorter radius. As such, the collapse of the tab and associated reduction in belt radius will cause the belt tension to lower. In this way, the lower belt tension resulting from the reduced radius will at least partially compensate for the higher tension due to increased belt load, and the belt tension will equilibrate. The belt tensions for lighter- or heavier-loaded belts will tend to be approximately the same (excluding other factors, for example, so long as the spring does not fully collapse, etc.)

If the belt were to become overloaded or movement of the belt becomes blocked, the collapsible tabs may be configured to further collapse and allow passage of the drive bar. This helps avoid belt lift up or breakage when compared to a spiral conveyor having fixed (non-collapsing) engagement tabs. This improves longevity of the belt and is more failure forgiving than existing overdrive systems. As such, the collapsible tabs may be configured to disengage from the drive bars if a belt tension exceeds a maximum tension (e.g., a predetermined maximum tension).

In some embodiments, the conveyor belt may be a radius conveyor belt configured to follow a curved path generally in a single plane rather than a curved, helical path. Such a configuration would provide the above-described benefits of load compensation and/or overload protection in a radius belt that does not traverse a helical path.

Embodiments of the present disclosure are advantageous in that existing spiral conveyors may be retrofit to include a collapsible tab and/or a guide. For example, a previous belt may be replaced by a belt of the present disclosure, having collapsible tabs. Alternatively, where a belt is made up of rows, and each row has more than one belt module, the inner modules (with respect to the helical path of a spiral) may be replaced with inner modules having collapsible tabs. In yet another alternative, collapsible tabs may be configured to attach to the existing belt modules. Existing spiral conveyors may also be retrofitted with a guide. For example, a tapered skirt may be added to a drive bar cage at the infeed. In another example, a guide rail may be added to an existing spiral conveyor at the infeed and corresponding teeth can be configured to be attached to the belt of the spiral conveyor.

Figure 14:
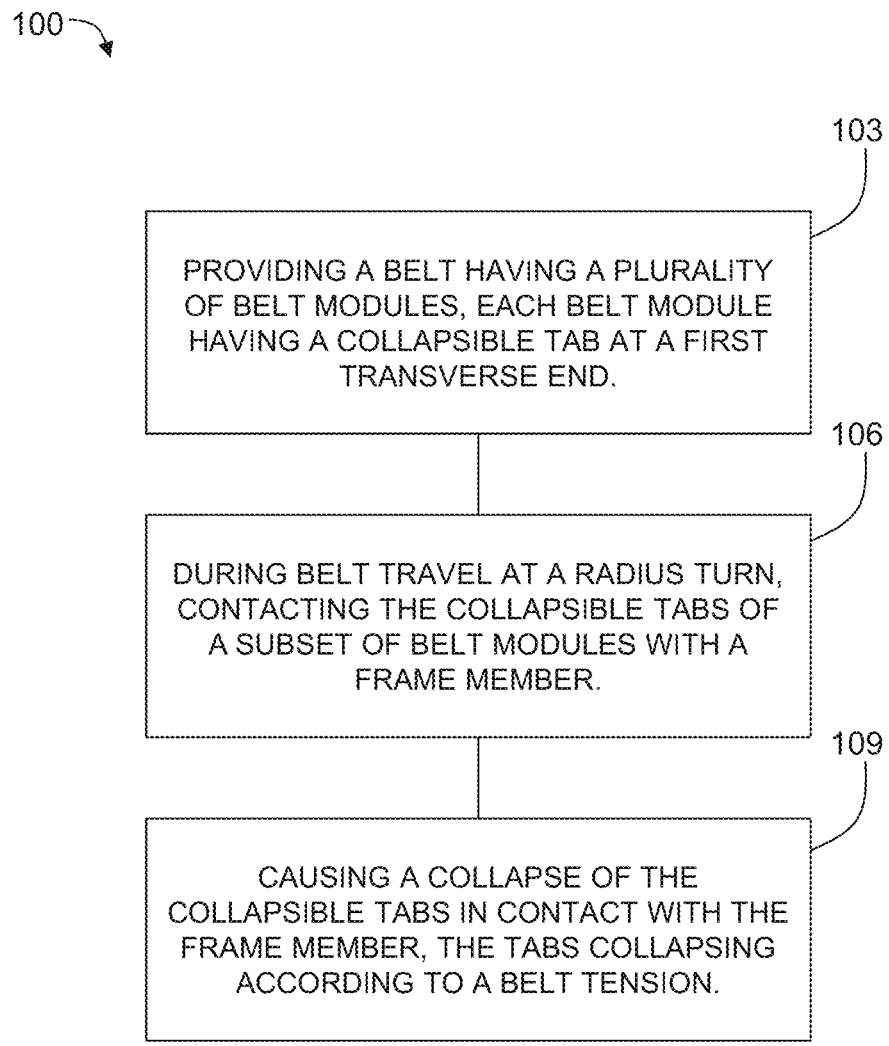
FIG. 14 is a chart of a method according to another embodiment of the present disclosure.

In another aspect, the present disclosure may be embodied as a method 100 for load compensation in a radius belt (see, for example, FIG. 14). The method 100 includes providing 103 a belt having a plurality of belt modules. Each belt module has a collapsible tab at a first transverse end of the respective belt module. The first transverse end is an end of the belt module which will traverse an inside curve of a radius turn.

During belt travel around a radius turn, the collapsible tabs of a subset of the plurality of belt modules are contacted 106 with a frame member at the radius turn. The subset of the belt modules are those which are at or near the radius turn portion of the belt path. For example, a frame of a conveyor system may include members such as guides, rails, drive bars, and/or other components at an inside of a radius turn where a transverse end of the each belt module is guided around the turn. In some embodiments, the frame member is stationary, such as, for example, a rail that the belt modules slide along when traversing a radius turn. In other embodiments, the frame member may move, such as, for example, in the above described drum where a plurality of drive bars rotate at an inside edge (with respect to the belt) of a radius turn. In the present method 100, the collapsible tab contacts 106 the frame member at the inside of the radius turn.

The collapsible tabs contacting the frame member are caused 109 to collapse according to a tension of the belt. A higher belt tension causes an increased collapse of the collapsible tabs, and the radius of the belt at the radius turn is accordingly decreased. As described above, such a decrease in belt radius will, in turn, lower the belt tension. Likewise, a decreased belt tension will cause a decrease in the collapse of the collapsible tabs and an associated increase in the belt radius at the radius turn—thereby increasing the belt tension.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A spiral conveyor, comprising:
   a rotating drum having a cylindrical periphery extending from a bottom end of the drum to a top end of the drum, the drum having a plurality of parallel drive bars arranged on the periphery of the drum; and
   a conveyor belt configured to advance along a helical path around the periphery of the drum from an infeed to an outfeed, the conveyor belt including a plurality of rows of belt modules, each row hingedly connected together with adjacent rows from a first transverse end of the rows to an opposite second transverse end of the rows, the first transverse end of at least some of the plurality of rows including a collapsible tab configured to engage with a drive bar of the drum for advancing the conveyor belt.

2. The conveyor of claim 1, wherein the first transverse end of each row includes a collapsible tab.

3. The conveyor of claim 1, wherein the collapsible tab is spring-biased to an extended position.

4. The conveyor of claim 3, wherein the collapsible tab is a spring.

5. The conveyor of claim 4, wherein each drive bar has a width selected to act on a predetermined number of unengaged collapsible tabs of rows.

6. The conveyor of claim 5, wherein a radius of the conveyor belt along the helical path decreases as the unengaged collapsible tabs are urged against the drive bars by increasing belt tension.

7. The conveyor of claim 6, wherein the springs have a spring rate configured to regulate the radius of the conveyor belt to maintain a substantially constant belt tension.

8. The conveyor of claim 1, wherein the collapsible tabs are configured to disengage from the drive bars if a belt tension exceeds a maximum tension.

9. The conveyor of claim 1, wherein the drum further comprises a guide at the infeed, the guide configured to ease the conveyor belt into engagement with the drive bars of the drum.

10. The conveyor of claim 9, wherein the guide is a rail.

11. The conveyor of claim 10, wherein each row further comprises a tooth configured to act on the rail.

12. The conveyor of claim 9, wherein the guide is a tapered skirt interdigitated with the drive bars.

13. The conveyor of claim 1, wherein the guide is configured to ease the conveyor belt into engagement with the drive bars over a distance of between 0.1 and 3 meters, inclusive.

14. A method for load compensation in a radius belt, comprising:
- providing a belt having a plurality of belt modules each with a collapsible tab at a first transverse end of the respective belt module;
- during belt travel around a radius turn, contacting the collapsible tabs of a subset of the plurality of belt modules with a frame member at an inside of the radius turn;
- causing a collapse of the collapsible tabs according to a tension of the belt, wherein a higher belt tension causes an increased collapse of the collapsible tabs thereby reducing a radius of the belt at the radius turn.

15. The method of claim 14, wherein the frame member further comprises a plurality of drive bars.

16. The method of claim 14, wherein the frame member is stationary.

* * * * *